US011010617B2

(12) United States Patent
Zhang et al.

(10) Patent No.: US 11,010,617 B2
(45) Date of Patent: May 18, 2021

(54) METHODS AND SYSTEMS FOR DETERMINING ROADWORK ZONE EXTENSION BASED ON LANE MARKING DATA

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 134 days.

(21) Appl. No.: 16/217,995

(22) Filed: Dec. 12, 2018

(65) Prior Publication Data

US 2020/0193173 A1 Jun. 18, 2020

(51) Int. Cl.
*G06K 9/00* (2006.01)
*G01C 21/36* (2006.01)

(52) U.S. Cl.
CPC ..... *G06K 9/00798* (2013.01); *G01C 21/3602* (2013.01)

(58) Field of Classification Search
CPC ............ G06K 9/00798; G01C 21/3602; G01C 21/32; G01C 21/30
See application file for complete search history.

(56) References Cited

U.S. PATENT DOCUMENTS

| | | | |
|---|---|---|---|
| 9,195,914 B2 | 11/2015 | Fairfield et al. | |
| 9,626,571 B2 | 4/2017 | Spangenberg | |
| 10,042,359 B1* | 8/2018 | Konrardy | B60R 25/102 |
| 2001/0056326 A1* | 12/2001 | Kimura | G01C 21/30 |
| | | | 701/446 |
| 2009/0174577 A1* | 7/2009 | Nakamura | G06K 9/00798 |
| | | | 340/995.1 |
| 2016/0046290 A1 | 2/2016 | Aharony et al. | |
| 2017/0010115 A1 | 1/2017 | Stein et al. | |
| 2019/0272389 A1* | 9/2019 | Viente | H04W 4/44 |
| 2020/0191576 A1* | 6/2020 | Zhang | G01C 21/3461 |

FOREIGN PATENT DOCUMENTS

| | | |
|---|---|---|
| CN | 106585622 A | 4/2017 |
| WO | 2011157251 A1 | 12/2011 |
| WO | 2017144319 A1 | 8/2017 |

OTHER PUBLICATIONS

Abramov et al., "A Flexible Modeling Approach for Robust Multi-lane Road Estimation", Jun. 6, 2017, 7 pages.

* cited by examiner

*Primary Examiner* — Charles T Shedrick
(74) *Attorney, Agent, or Firm* — Ditthavong, Steiner & Mlotkowski

(57) ABSTRACT

A method, a system, and a computer program product are provided for determining roadwork extension data for identification of at least one roadwork extension. The method, for example, includes clustering a first plurality of lane marking observations captured by a plurality of vehicles, based on a lane marking location and a lane marking heading of each of the first plurality of lane marking observations to generate at least one lane marking cluster and map-matching the lane marking cluster to one or more links to obtain one or more map-matched links. The method further includes searching for one or more missing links associated with each of the map-matched links based on link attributes of the map-matched links and a distance threshold and generating the roadwork extension data based on the map matched links and the missing links.

20 Claims, 6 Drawing Sheets

FIRST CLUSTERS

LANE MARKING CLUSTERS

METHODS AND SYSTEMS FOR DETERMINING ROADWORK ZONE EXTENSION BASED ON LANE MARKING DATA

TECHNOLOGICAL FIELD

The present disclosure generally relates to identifying roadwork zones in a geographical region, and more particularly relates to determining roadwork extension data of the identified roadwork zones.

BACKGROUND

Road works or roadwork zones are typically found on a section of a road or an entire road that is occupied for the purpose of, for example, road surface repairs, work on power lines, water works, etc. Roadwork zones may also be found when a major accident occurs and road debris from the accident needs to be cleared. Such roadwork zones are indicated to users of vehicles or autonomous vehicles using road signs, such as, "men at work" sign, "roadwork ahead" sign etc., or temporary signs such as traffic cones, barrier boards, etc. In some countries, the roadwork zones are indicated to the users of vehicles or autonomous vehicles using lane markings from a distance of the roadwork zone and speed limit signs from a distance of the roadwork zone. For autonomous vehicles, identifying such lane markings well in advance may help avoid collisions and undue mishaps.

BRIEF SUMMARY

Vehicles on a road, typically, rely on map databases that contain information regarding road geometry, lane geometry, road link connectivity, road type, etc. The information in the map databases may be enriched with data sources that provide traffic data, weather related data, and information related to road maintenance. A plurality of sensors, installed onboard the vehicles may provide information related to roadwork zones to augment the content of the map databases or remote map data providers, alert the user of the vehicles of a hazardous condition or even provide input for controlling the vehicle in an autonomous or semi-autonomous manner. Detection of the roadwork zones is essential for navigation of vehicles and providing environmental awareness for vehicle safety has been a primary concern for automobile manufacturers and related service providers. It would be advantageous to identify a roadwork zone by detecting lane markings for vehicles in an identified roadwork zone. An autonomous vehicle may detect lane markings and may transition from an autonomous driving mode to a manual driving mode when the roadwork zone is approaching. It would be further advantageous to identify a start of the roadwork zone and an end of the roadwork zone to aid the autonomous vehicle in smooth transition between the autonomous mode and the manual mode for safety of the vehicles and of the personnel working at the roadwork zone.

A method, a system, and a computer program product are provided in accordance with an example embodiment described herein for determining roadwork extension data for identification of at least one roadwork extension.

Embodiments disclosed herein may provide a method for determining roadwork extension data for identification of at least one roadwork extension. The method includes: clustering a first plurality of lane marking observations captured by a plurality of vehicles, based on a lane marking location and a lane marking heading of each of the first plurality of lane marking observations to generate at least one lane marking cluster, map-matching by a processor, the generated at least one lane marking cluster to one or more links based on the lane marking location and the lane marking heading of each lane marking observation in the generated at least one lane marking cluster, to obtain one or more map-matched links, searching by the processor, for one or more missing links associated with each of the map-matched links based on link attributes of the map-matched links and a distance threshold; and generating by the processor, the roadwork extension data based on the map matched links and the missing links. The lane marking observations are associated with yellow lane markings along pathways traversed by the plurality of vehicles.

Clustering of the first plurality of lane marking observations comprises creating a first clustering label corresponding to the lane marking location of each of the first plurality of lane marking observations to generate at least one first cluster, and sequentially clustering a second plurality of lane marking observations in the generated at least one first cluster, based on the lane marking heading of each of the second plurality of lane marking observations to generate the at least one lane marking cluster. The clustering of the first plurality of lane marking observations further includes filtering and removing outliers of the at least one first cluster and the at least one lane marking cluster. The at least one lane marking cluster is map-matched to one or more links of one or more predefined functional classes. Generating the roadwork extension data includes identifying a start position of the determined at least one roadwork extension based on an upstream node of a first roadwork link of the plurality of roadwork links being labeled as a start roadwork link and identifying an end position of the determined at least one roadwork extension based on the upstream node of the first roadwork link of the plurality of roadwork links. The link attributes of the plurality of roadwork links includes functional class of each of the plurality of roadwork links, a link start location of each of the plurality of the roadwork links and a link end location of each of the plurality of the roadwork links.

In an example embodiment, a system for determining roadwork extension data for identification of at least one roadwork extension is provided. The system may include at least one non-transitory memory configured to store computer program code instructions, and at least one processor configured to execute the computer program code instructions to at least: cluster a first plurality of lane marking observations captured by a plurality of vehicles, based on a lane marking location and a lane marking heading of each of the first plurality of lane marking observations to generate at least one lane marking cluster, map-match the generated at least one lane marking cluster to one or more links based on the lane marking location and the lane marking heading of each lane marking observation in the generated at least one lane marking cluster, to obtain one or more map-matched links, search for one or more missing links associated with each of the map-matched links based on link attributes of the map-matched links and a distance threshold, and generate the roadwork extension data based on the one or map matched links and the missing links.

To cluster the first plurality of lane marking observations, the processor is further configured to create a first clustering label corresponding to the lane marking location of each of the first plurality of lane marking observations to generate at least one first cluster, and sequentially cluster a second plurality of lane marking observations in the generated at least one first cluster, based on the lane marking heading of each of the second plurality of lane marking observations to generate the at least one lane marking cluster. The processor is further configured to filter and remove outliers of the at least one first cluster and the at least one lane marking cluster. The processor is further configured to map-match the generated at least one lane marking cluster to the links of one or more predefined functional classes. The roadwork extension data comprises a plurality of roadwork links, each comprising location data and heading data and to generate the roadwork extension data, the processor is further configured to identify a start position of the determined at least one roadwork extension based on an upstream node of a first roadwork link of the plurality of roadwork links being labeled as a start roadwork link, and identify an end position of the determined at least one roadwork extension based on the upstream node of the first roadwork link of the plurality of roadwork links.

Embodiments of the present invention may provide a computer program product including at least one non-transitory computer-readable storage medium having computer-executable program code instructions stored therein. The computer-executable program code instructions when executed by a computer, cause the computer to carry out operations for determining roadwork extension data for identification of at least one roadwork extension, the operations including: clustering a first plurality of lane marking observations captured by a plurality of vehicles, based on a lane marking location and a lane marking heading of each of the first plurality of lane marking observations to generate at least one lane marking cluster, map-matching the generated at least one lane marking cluster to one or more links based on the lane marking location and the lane marking heading of each lane marking observation in the generated at least one lane marking cluster, to obtain one or more map-matched links, searching for one or more missing links associated with each of the map-matched links based on link attributes of the map-matched links and a distance threshold, and generating the roadwork extension data based on the one or map matched links and the missing links. For clustering of the first plurality of lane marking observations, the operations further include creating a first clustering label corresponding to the lane marking location of each of the first plurality of lane marking observations to generate at least one first cluster; and sequentially clustering a second plurality of lane marking observations in the generated at least one first cluster, based on the lane marking heading of each of the second plurality of lane marking observations to generate the at least one lane marking cluster. The roadwork extension data comprises a plurality of roadwork links, each comprising location data and heading data and for the generating of the roadwork extension data, the roadwork extension data includes identifying a start position of the determined at least one roadwork extension based on an upstream node of a first roadwork link of the plurality of roadwork links being labeled as a start roadwork link; and identifying an end position of the determined at least one roadwork extension based on the upstream node of the first roadwork link of the plurality of roadwork links.

BRIEF DESCRIPTION OF THE DRAWINGS

Figure 1:
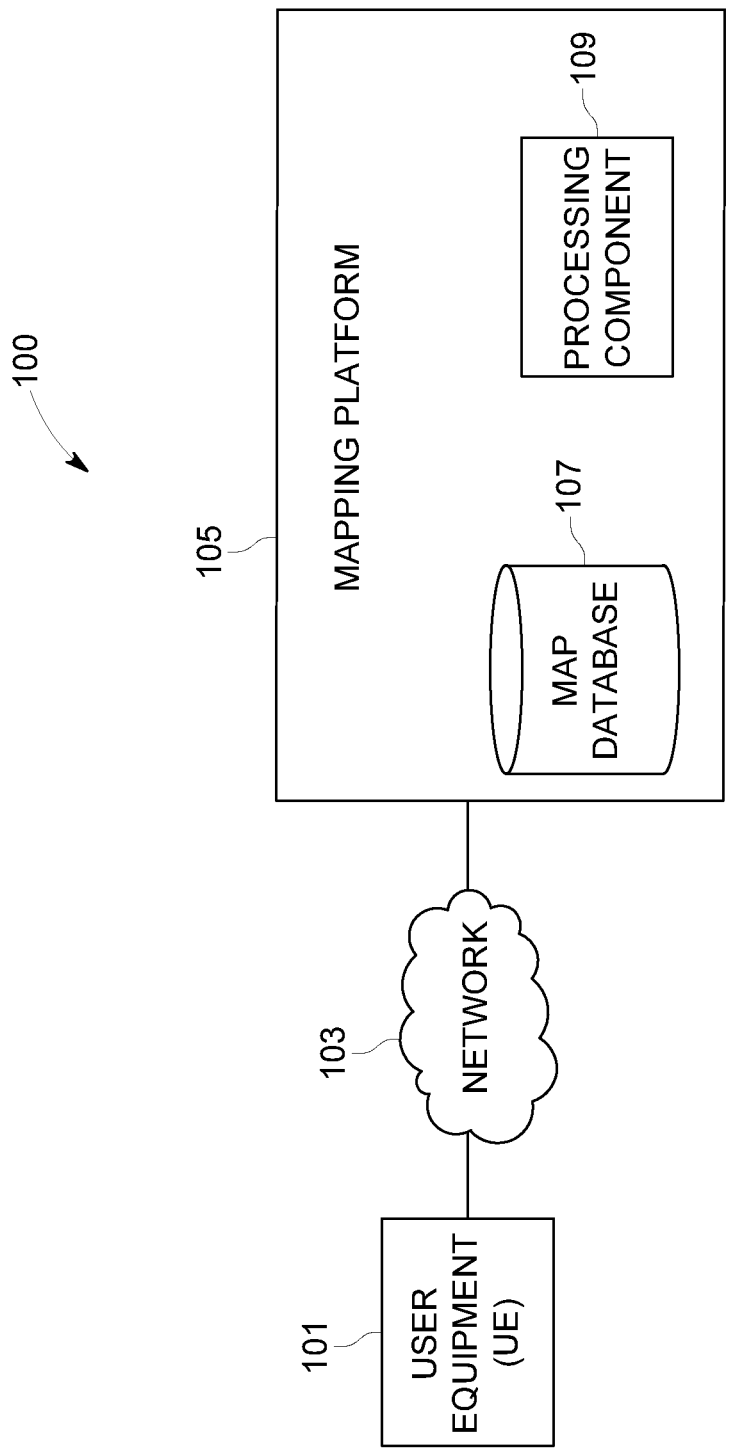
Figure 2:
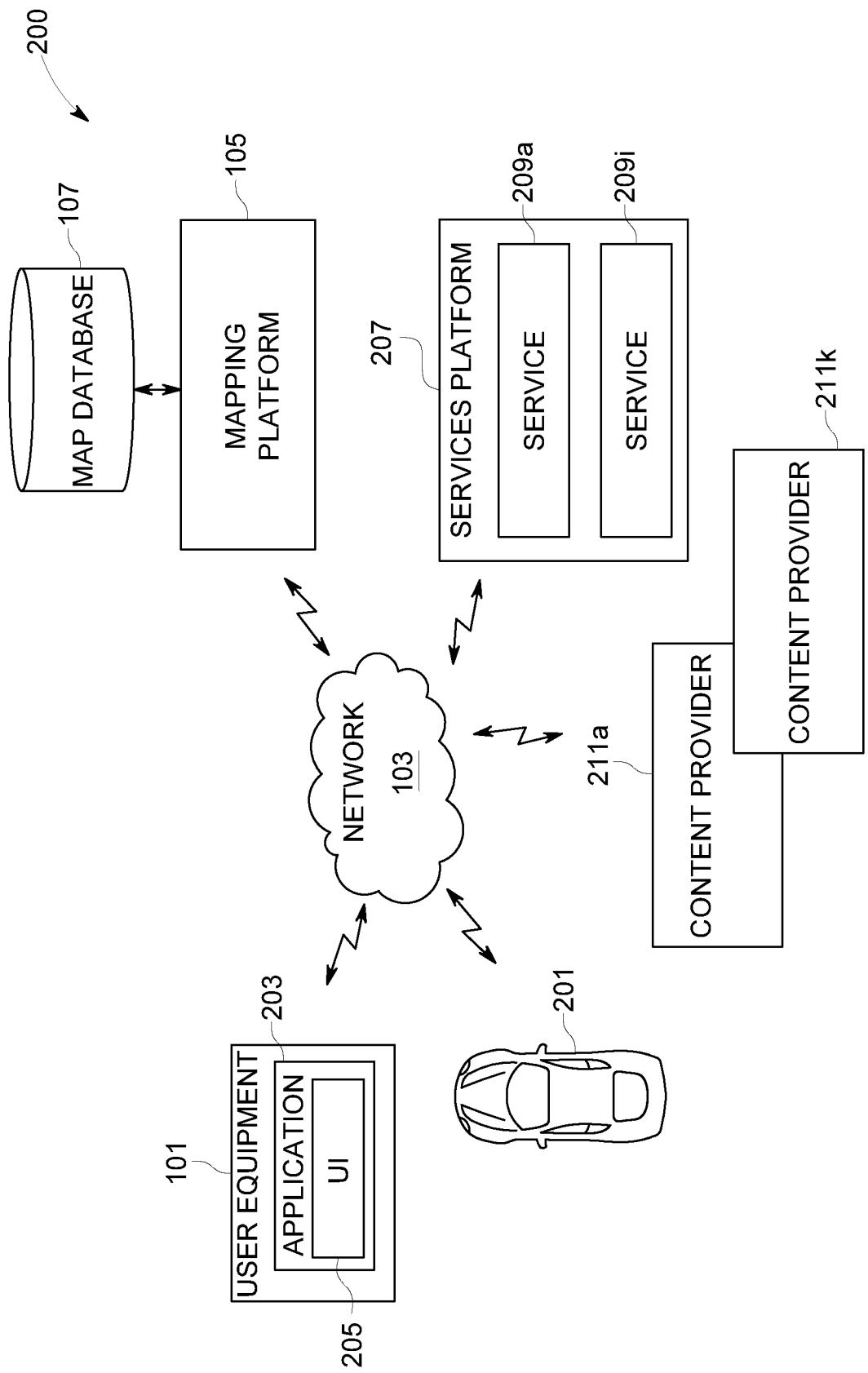
Figure 3:
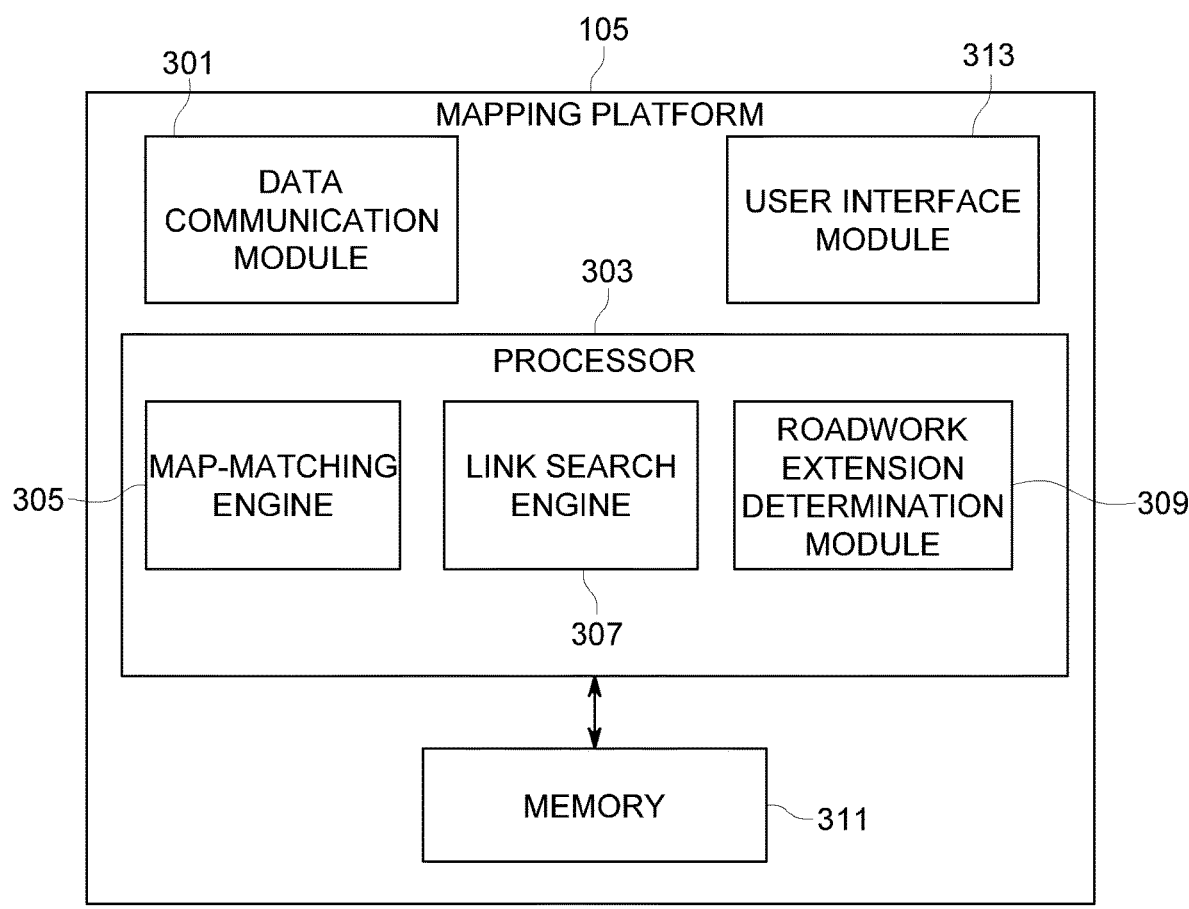
Figure 4:
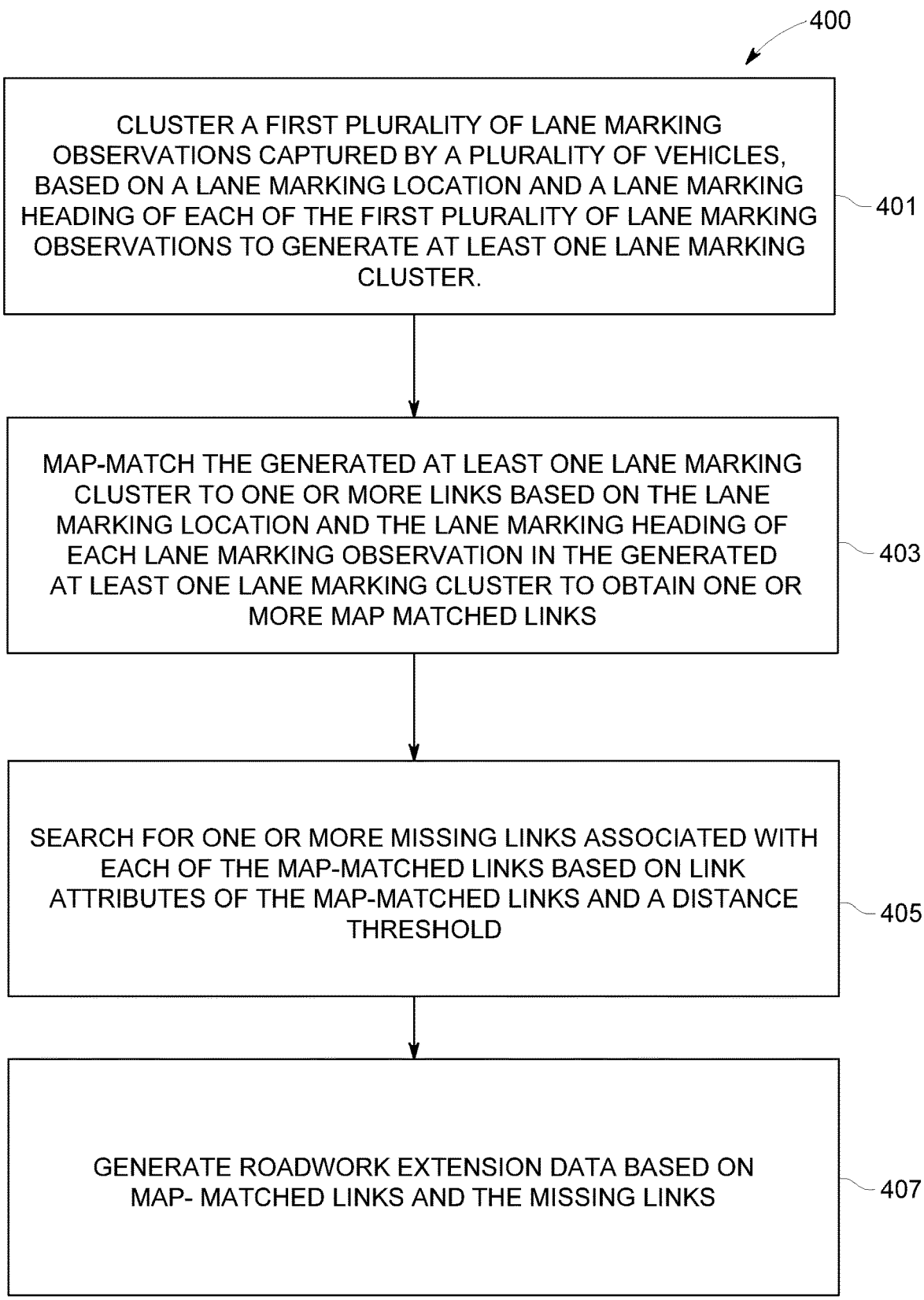
Figure 5A:
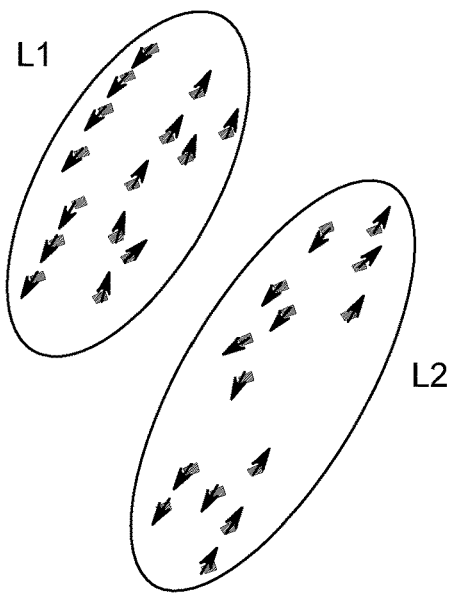
Figure 5B:
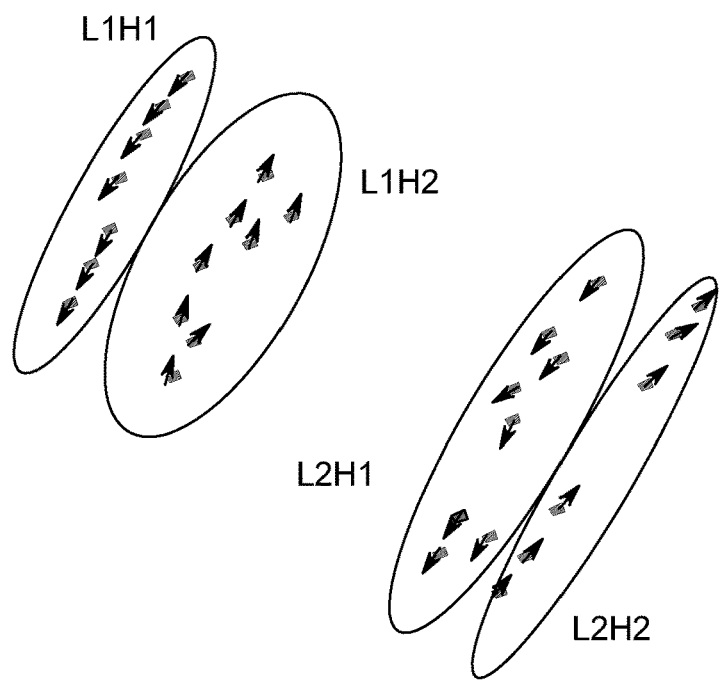
Figure 6:
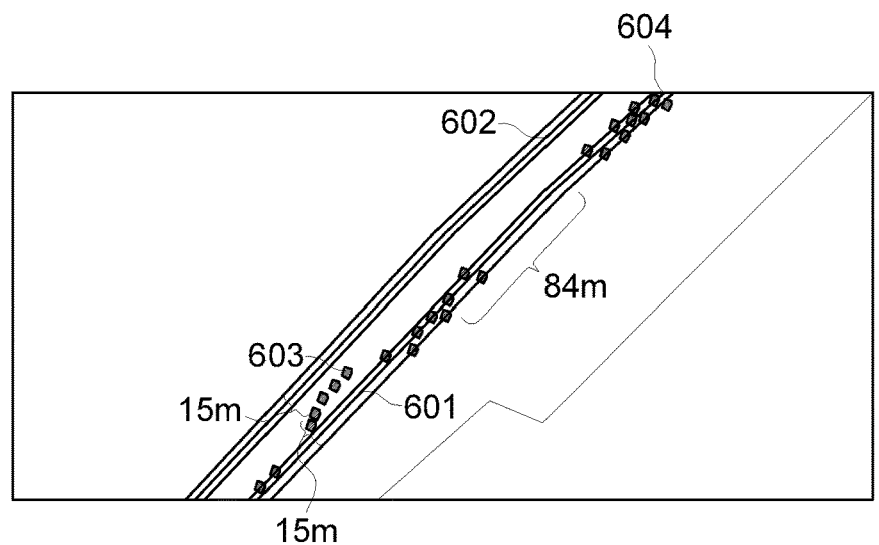
Figure 7:
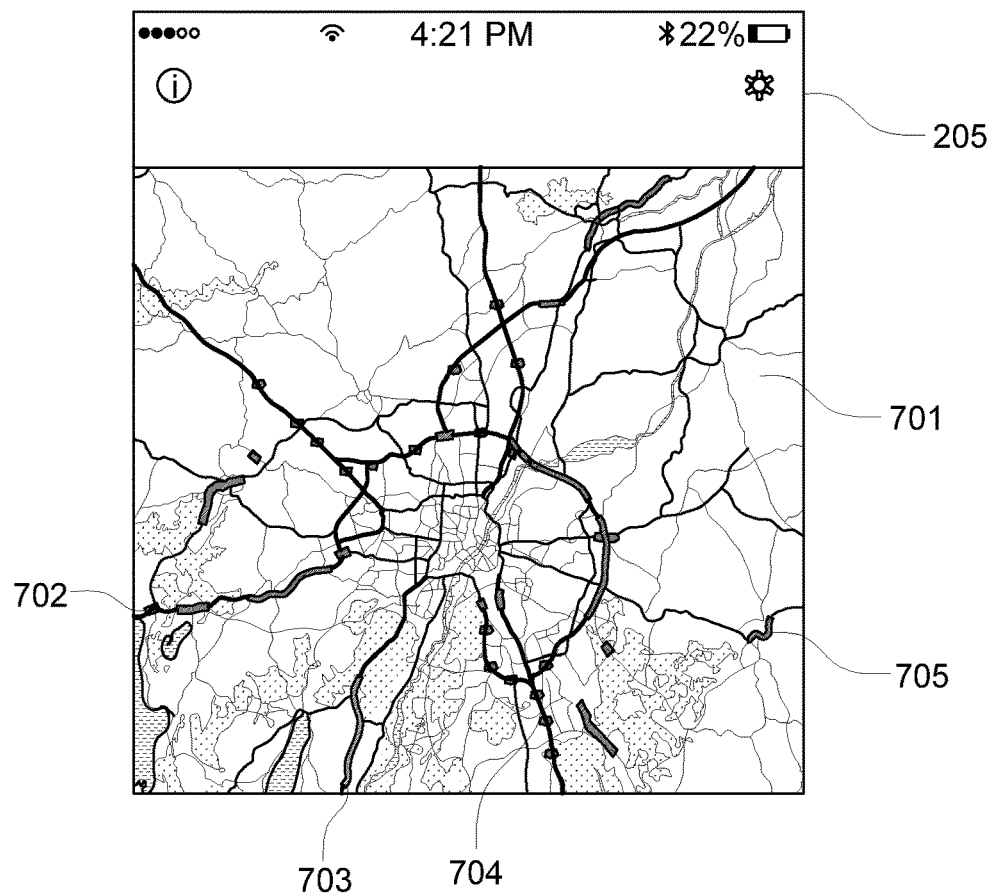

Having thus described example embodiments of the invention in general terms, reference will now be made to the accompanying drawings, which are not necessarily drawn to scale, and wherein:

FIG. 1 illustrates a schematic diagram of a system for determining roadwork extension data for identification of at least one roadwork extension, in accordance with an example embodiment;

FIG. 2 illustrates a block diagram of one embodiment of a system for determining roadwork extension data for identification of at least one roadwork extension, in accordance with an example embodiment;

FIG. 3 illustrates a block diagram of a mapping platform exemplarily illustrated in FIG. 2 that may be used to determine roadwork extension data for identification of at least one roadwork extension, in accordance with an example embodiment;

FIG. 4 illustrates a method for determining roadwork extension data for identification of at least one roadwork extension, in accordance with an example embodiment;

FIGS. 5A-5B illustrate schematic diagrams showing clustering of lane marking observations to generate one or more lane marking clusters, in accordance with an example embodiment;

FIG. 6 illustrates a schematic diagram showing a section of a map with links for map-matching of lane marking observations by the mapping platform 105, in accordance with an example embodiment; and FIG. 7 illustrates the user interface 205 showing a section of a map with identified roadwork zones for a vehicle 201 to navigate, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "route" may be used to refer to a path from a source location to a destination location on any link.

The term "roadwork extension" may be used to refer to an extent of a roadwork zone on a pathway. The extent of the roadwork zone may be defined by a start position and an end position of the roadwork zone.

End of Definitions

A method, a system, and a computer program product are provided herein in accordance with an example embodiment for determining roadwork extension data for identification of at least one roadwork extension. Roadwork zones are temporarily defined by authorities to take up road repair work of a section of the road or an entire road. In such cases, the authorities may merge the two lanes of a road, or divert a lane to a by-lane, etc. Such roadwork repairs are indicated to travelers in advance of the actual commencement of the roadwork zone because such merging of the lanes may require reduction in speed of the vehicles to avoid collision or any mishap. The roadwork zones are indicated to the users by means of road signs, such as static or dynamic speed limit signs along the pathway, lane markings, etc. Vehicles may detect the lane markings along a pathway in the vicinity of a roadwork. The detection of the lane markings needs to be derived from a map database and vehicles' on-board sensors. The detection of the lane markings using the vehicles' on-board sensors may be in real time and the sensor data may be analyzed, coded, and relevant information derived from the sensor data may be distributed to users via user equipment for safe navigation through the roadwork zones.

Further, in order to achieve high accuracy, the current technology for detecting the lane markings accurately and providing driver assistance ingests smart sensor data from the sensors installed on the vehicles and performs analysis, coding, and distribution of relevant information derived from the sensor data and conflated with other sources. The smart sensor data collected is used to update a map database in real time. However, to update the map database about the lane markings indicating the roadwork zones, the lane markings need to be identified with accuracy in a start position and an end position of the roadwork zones.

Also, the detection of the roadwork zones is essential for autonomous vehicles and semi-autonomous vehicles as the autonomous vehicle or the semi-autonomous vehicle may need to transition from autonomous mode to manual mode while approaching a roadwork zone to avoid mishaps in the roadwork zone. The detection of the lane markings are discrete observations. That is, the detection of the lane markings by the vehicles are point based observations indicating co-ordinates of location of the roadwork zone.

Vehicles may fail to detect some lane markings due to environmental conditions, such as, visibility, weather conditions, and lighting conditions, etc., prevailing at the time of detection of the lane markings. Failure in detection of some lane markings by vehicles may be caused, for example, by sunlight being reflected in a particular manner at a time of a day, the lane markings may be occluded by water, mud, or snow, some vehicles may miss the lane markings as other vehicles may be obstructing the view of lane markings. Such discrete observations of the lane markings, usually in no particular sequence, and sometimes failure in detection of the lane markings may provide incomplete assessment of the roadwork zone and navigation through the roadwork zone. The present invention addresses the aforesaid problems by providing a method and a system to identify roadwork zones and determine connectivity between the discrete observations to define extent of the roadwork zones for safe navigation of vehicles, autonomous vehicles and semi-autonomous vehicles through the roadwork zones.

FIG. 1 illustrates a schematic diagram of a system 100 for determining roadwork extension data for identification of at least one roadwork extension, in accordance with an example embodiment. The system 100 may determine roadwork extension data, that is, a start position and an end position of one or more roadwork zones. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. Although a single user equipment 101 is depicted in the FIG. 1, it may be contemplated that the mapping platform 105 may be communicatively coupled with several user equipment. It may further be contemplated that one or more user equipment may serve as data capturing devices while one or more other user equipment may serve as beneficiary devices that receive and utilize output data generated by the system for various applications such as navigation assistance. However, for the sake of simplicity, both functionalities may be explained with reference to a single user equipment such as the user equipment 101.

The user equipment 101 may be beneficiary user equipment in a navigation system, that may be configured to provide route guidance and navigation related functions to the user of a vehicle. In some embodiments, the user equipment 101 may be installed in the vehicle and may capture lane markings. The lane markings may be of an alternate color in contrast to the color of surface of the road. In some example embodiments, lane markings are yellow in color to indicate roadwork zones. In alternate embodiments, other colors for lane or road markings can be used to indicate roadwork, such as red, pink, green, blue, or any other color. The user equipment 101 may also include an image capturing device, such as a camera for capturing the lane markings. Using the captured lane markings, the user equipment 101 generates lane marking observations. The vehicle may also include one or more sensors for generating the lane marking observations. The user equipment 101 or the sensors in the vehicle may transmit the generated lane marking observations to an OEM cloud sequentially. In an embodiment, the lane marking observations may be scheduled to be transmitted to the OEM cloud in batches.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data or the like. In an embodiment, the map database 107 may be a local replica/copy of an external map database of a map service provider that is it may be downloaded from the external map database. In some embodiments, the map database 107 may be a cached version of a map database hosted in a cloud. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records.

The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to roadwork zones, such as, location of the roadwork zones, diversions to be caused due to the roadwork zones, suggested routes to avoid congestion to be caused due to the roadwork zones, etc. The data related roadwork zones may be fetched by the system 100 from external systems, such as, roadwork planning system of the municipalities.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing determination of one or more routes through a roadwork zone and navigation-related functions and/or services through the roadwork zone, such as, route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the mapping platform 105 may be a master geographic database configured at a server side, but in alternate embodiments, a client side mapping platform may represent a compiled navigation database that may be used in or with end user devices (e.g., user equipment 101) to provide navigation, speed adjustment and/or map-related functions to navigate through roadwork zones. The mapping platform 105 may fetch the lane marking observations from the OEM cloud and may cluster the lane marking observations obtained from a plurality of vehicles. The mapping platform 105 may further map-match the clusters of the lane marking observations on links of a map developed by the map developer. The lane marking observations may correspond to start of one or more roadwork zones, end of the roadwork zones, and route through the roadwork zones. The lane marking observations may comprise for example image data pertaining to the lane markings on a road, location at which the image data is captured, heading of the vehicle at the instance of capture, speed of the vehicle at the instance of capture, the time stamp of the instance of capture, and the like. From the map-matched links, the mapping platform 105 may determine extension of the roadwork zones and sequence of connections between the map-matched links that represent one or more routes through the roadwork zones. Furthermore, the mapping platform 105 may generate roadwork extension data of the roadwork zones. The mapping platform 105 may be used with the end user device, that is, the user equipment 101 to provide the user with navigation features. In such a case, the mapping platform 105 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes through the roadwork zones, according to some example embodiments. In some embodiments, the user of the vehicle may be notified by the mapping platform 105 about location of the roadwork zones and the user may use the user equipment 101, for example, the in-vehicle navigation system for navigation and map functions such as guidance and map display, according to some example embodiments. The user equipment 101 may include an application, for example, a mapping application with a user interface that may enable the user to access the mapping platform 105 for availing the functions disclosed above, such as, for navigating on one or more routes through identified roadwork zones.

FIG. 2 exemplarily illustrates a block diagram of one embodiment of a system 200 for determining roadwork extension data identifying at least one roadwork extension for navigation of a vehicle 201 through a roadwork zone using a mapping platform 105. The vehicle 201 may be a user driven vehicle or an autonomous vehicle. An autonomous vehicle, as used throughout this disclosure, may refer to a vehicle having autonomous driving capabilities at least in some conditions. For example, the autonomous vehicle may exhibit autonomous driving on streets and roads having physical dividers between driving lanes. The system 200 includes a user equipment 101, including an application 203 with a user interface 205 for accessing one or more map and navigation related functions. The vehicle 201 may include one or more sensors such as a camera, an acceleration sensor, a gyroscopic sensor, a LIDAR sensor, a proximity sensor, a motion sensor and the like. The sensors may primarily be used for detecting lane markings and determining positioning of the vehicle 201 and the sensors may be built-in or embedded into or within interior of the user equipment. In some embodiments, the vehicle 201 uses communication signals for position determination. The vehicle 201 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors in the vehicle may be used to gather information related to an environment of the vehicle 201, such as, the roadwork zone. In some embodiments, the vehicle 201 may have a user equipment similar to the user equipment similar to 101 with sensors positioned on or within and the sensors may provide data indicating a location of the vehicle 201 and heading data associated with lane markings on pathways approaching a roadwork zone. The data collected by the sensors may be transmitted to the OEM cloud. Vehicle data, also referred to herein as "probe data", may be collected by any device capable of determining the necessary information, and providing the necessary information to a remote entity. The user equipment 101 is one example of a device that may function as a probe to collect probe data of a vehicle 201.

More specifically, probe data collected by the user equipment in the vehicle 201 may be representative of the location of a vehicle 201 at a respective point in time and may be collected while a vehicle 201 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment in the vehicle 201 may be any device capable of collecting the aforementioned probe data. In one example, using the sensor data from the sensors installed in the vehicle 201 or the sensors in the user equipment in the vehicle 201, a mapping platform 105 similar to the mapping platform exemplarily illustrated in FIG. 1, may determine roadwork extension data for identification of at least one roadwork extension to assist the vehicles, such as 201 to navigate through the roadwork zone. The sensor data generated by the sensors may constitute lane marking observations. That is, the sensors installed in a plurality of vehicles, such as, 201 or the user equipment in the vehicle 201 may capture lane markings of different colors on the pathway and capture the location of the lane markings, heading at the location of the lane markings, and time stamp associated with the time of capture of the lane markings. The captured location of the lane markings, heading at the location of the lane markings, and time stamp associated with the capture of the lane markings constitute the lane marking observations. The processing of the lane marking observations to generate a plurality of map-matched links and processing the plurality of map-matched links to identify a start link and an end link of the roadwork zone from the map-matched links to determine extent of the roadwork zone is performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 207, which may be used to provide navigation related functions and services 209a-209i to the application 203 running on the user equipment 101. The services 209a-209i may include such as navigation functions, speed adjustment functions, traffic related updates, weather related updates, warnings and alerts, parking related services, indoor mapping services and the like. The services 209a-209i may be provided by a plurality of content providers 211a-211k. In some examples, the content providers 211a-211k may access various SDKs from the services platform 207 for implementing one or more services. In an example, the services platform 207 and the mapping platform 105 may be integrated into a single platform to provide a suite of mapping and navigation related applications for OEM devices, such as the user equipment 101. The user equipment 101 may be configured to interface with the services platform 207, the content provider's services 211a-211k, and the mapping platform 105 over a network 103. Thus, the mapping platform 105 and the services platform 207 may enable provision of cloud-based services for the user equipment in the vehicle 201, such as, storing the lane marking observations in a OEM cloud in batches or in real-time and retrieving the stored lane marking observations for determining roadwork extension data of one or more roadwork zones, as disclosed in the detailed description of FIG. 3, by the plurality of vehicles, such as, 201 carrying the user equipment.

FIG. 3 illustrates a block diagram of a mapping platform 105 exemplarily illustrated in FIG. 2 that may be used to determining roadwork extension data for identification of at least one roadwork extension, in accordance with an example embodiment of the present invention. In the embodiments described herein, the mapping platform 105 comprises a data communication module 301, a map-matching engine 305, a link search engine 307, a roadwork extension determination module 309, and a user interface module 313. In this embodiment exemplarily illustrated in FIG. 3, the map-matching engine 305, the link search engine 307, and the roadwork extension determination module 309, are embodied within a processor 303. The processor 303 may retrieve computer program code instructions that may be stored in a memory 311 for execution of the computer program code instructions by the modules 305, 307, and 309 of the mapping platform 105. The processor 303 may control the execution of the computer program code instructions by the various modules (viz. 301, 305, 307, 309, and 313) of the mapping platform 105. In one embodiment, the data communication module 301 communicates with the sensors disclosed in the detailed description of FIG. 2 and may receive the sensor data and a first plurality of lane marking observations from the sensors. In an embodiment, the data communication module 301 may receive the lane marking observations from the OEM cloud over the network 103. The first plurality of lane marking observations may be from detection of lane markings, for example, yellow lane markings or detection of any other color indicative of roadwork, indicating a roadwork zone in countries, such as Europe. The first plurality of lane marking observations comprise time of capture of the lane markings from vehicles such as, 201 as a time stamp associated with each of the lane marking observations. The lane marking may be continuous all throughout the roadwork zone. In some example embodiments, the lane markings may be discrete. Based on the lane markings, the lane marking observations may be continuous or discrete. The lane marking observations may be point based observations, that is, the lane marking observations comprise location of capture of different lane markings by the vehicles such as 201. The vehicle, such as, 201 passing by the location of lane markings generate the lane marking observations for each of the lane markings. Thus, each lane marking observation is different from other lane marking observations based on location data, heading data, and time of capture of the lane marking from a vehicle. The data communication module 301 may receive sensor data configured to describe a position of the vehicle, the user equipment installed in the vehicle, or a controller of the user equipment may receive the sensor data from the positioning system of the user equipment. The location of the lane marking is the location of capture of the lane marking from vehicles, such as, 201 and the location of the lane marking constitutes the location data in a lane marking observation. The location of the lane marking observations includes co-ordinates with a latitudinal component and a longitudinal component. Similarly, the heading associated with a lane marking is the heading of the vehicle 201 capturing the lane marking and the heading of the lane marking is the heading data in a lane marking observation.

In some example embodiments, the data communication module 301 may receive destination information of a user of a vehicle, such as, 201 that may navigate through the roadwork zone via the network 103. The data inputted to the mapping platform 105, for example, the sensor data, etc., is transformed, processed, and executed upon by the mapping platform 105 to map-match to links in a map database 107 by the map-matching engine 305 as disclosed below. The sensor data from the different sensors installed in the user equipment 101 or the vehicle 201 may be converted to units and ranges compatible with the mapping platform 105, to accurately map-match the lane marking observations to links in the map database 107, identify roadwork zones and determine roadwork extension data of the roadwork zones.

In some example embodiments, the map-matching engine 305 may cluster a first plurality of lane marking observations captured by the vehicles, such as, 201 based on a lane marking location and a lane marking heading of each of the first plurality of lane marking observations to generate at least one lane marking cluster as exemplarily illustrated in FIGS. 5A-5B. A lane marking location refers to the location of capture of the lane marking observation and a lane marking heading refers to the heading data in the lane marking observation. The map-matching engine 305 implements clustering algorithms, such as, DBSCAN algorithm to cluster the lane marking observations into one or more clusters. Different clusters may indicate different roadwork zones. The map-matching engine 305 may create a first clustering label corresponding to the lane marking location of each of the lane marking observations to generate at least one first cluster. That is, the map-matching engine 305 may cluster the lane marking observations based on locations of the lane marking observations and labels the location based clustered lane marking observations.

The map-matching engine 305 may sequentially cluster a second plurality of lane marking observations in the generated first cluster based on the lane marking heading of each of the second plurality of lane marking observations to obtain at least one lane marking cluster. In other words, the map-matching engine 305 may further cluster the location based clustered lane marking observations based on heading data of the location based clustered lane marking observations to obtain one or more lane marking clusters. The map-matching engine 305 may label the heading based clustered lane marking observations in the lane marking clusters. The map-matching engine 305 may filter and remove outliers from the lane marking observations, thereby avoiding false detection of lane markings by the sensors.

The map-matching engine 305 may further map-match the generated lane marking cluster to one or more links in the map database 107 to obtain one or more map-matched links. In an embodiment, the map-matching engine 305 may map-match the lane marking cluster to links of one or more predefined functional classes, that is, the map-matching is performed to links with functional classes 1-4. A functional class classifies pathways in a geographical region based on speed, importance, and connectivity of the pathways. In the map database 107, the links are associated with functional classes. The links with functional classes 1-4 may allow a higher volume of traffic movement at varied speeds, while the link with the functional class 5 may have less traffic movement as compared to the other links. The link with functional class 5 may be parallel a link with functional class 1-4 may lead to wrongful map-matching of the lane marking observations as disclosed in the detailed description of FIG. 6.

The link search engine 307 may generate a route by determining connections between the map-matched links generated from lane marking observations of the same lane marking cluster. The map-matched links from the lane marking observations of the same lane marking cluster with a same clustering label may indicate a roadwork zone and the connectivity between the map-matched links may result in one or more routes through the same roadwork zone. Since the lane marking observations are discrete, some map-matched links through the roadwork zone may be missing as corresponding lane marking observations may be missing. The link search engine 307 searches for map-matched links in downstream and upstream of available map-matched links to define a route through the roadwork zone. The link search engine 307 may search for map-matched in links in the upstream and the downstream of the available map-matched links map-matched by the map-matching engine 305 within a distance threshold, such as, 150 meters, from the available map-matched links. In an embodiment, the link search engine 307 may search for the map-matched links in the downstream and the upstream of the available map-matched links based on links attributes, such as, an upstream heading and downstream heading of each of the map-matched links, locations of start node and end node of each of the map-matched links, locations of shape points on each of the map-matched links, and length of each of the map-matched links. The link search engine 307 obtains map-matched links forming one or more routes through the roadwork zone on searching for missing map-matched links in the upstream and the downstream of the available map-matched links based on the link attributes. The link search engine 307 may store the map-matched links forming one or more routes through the roadwork zone in the map database 107. The link search engine 307 may identify roadwork links as the map-matched links with roadwork zone. The link search engine 307 may identify a first roadwork link as a start roadwork link with a start position of the roadwork zone and a second roadwork link as an end roadwork link with an end position of the roadwork zone.

The roadwork extension determination module 309 may identify the start position of the roadwork zone on the start roadwork link based on an upstream node or a start node of the start roadwork link. The roadwork extension determination module 309 may identify the end position of the roadwork zone on the end roadwork link based on the start node of the start roadwork link. The roadwork extension determination module 309 may compute distance between the location of the start node of the start roadwork link and location of each of the lane marking observations on the start roadwork link. The location of the lane marking observations within a shortest difference from the start node of the start roadwork link is the start position of the roadwork zone. Similarly, the roadwork extension determination module 309 may compute distance between the location of the start node of the start roadwork link and location of each of the lane marking observations on the end roadwork link. The location of the lane marking observations on the end roadwork link farthest from the start node of the start roadwork link is the end position of the roadwork zone. The roadwork extension determination module 309 determines the roadwork extension data that defines the extent of the roadwork zone. The roadwork extension data comprises a start offset and an end offset of the roadwork zone. The roadwork extension determination module 309 computes the start offset as the distance between start node of the start roadwork link and the start position of the roadwork zone and the end offset as the distance between start node of the roadwork link and the end position of the roadwork zone. The map-matched links between the start position of the roadwork zone and the end position of the roadwork zone is where the roadwork takes place. The roadwork extension data may further include location data and heading data of each of the roadwork links, including the start roadwork link and the end roadwork link.

Based on the generated roadwork extension data of the roadwork zone, the user interface module 313 may output the generated roadwork extension data on the user interface 205. The user interface module 313 may output notifications regarding alternative navigation routes through an approaching roadwork zone on the user interface 205. In an embodiment, the user interface module 313 may render indications of a roadwork zone ahead on the user interface 205. In an embodiment, the user interface module 313 may provide navigation suggestions to the user of the vehicle 201 to avoid the roadwork zone based on destination of the user. The different representations of the navigation suggestions may be in the form of a map with color coded or patterned road links indicating traffic conditions on the route, locations of speed funnels on the route, etc. In an embodiment, the user interface module 313 may receive destination information from the user on the user interface 205 of the user equipment 101. In some example embodiments, the user interface module 313 may notify the users of the vehicles 201 via the user interface 205 of the user equipment 101 about roadwork zone ahead and navigation routes available through the roadwork zones. In some example embodiments, the user interface module 313 renders the notification about changes in navigation routes due to the roadwork zone ahead and impact of the modified roadwork zones on parking situations, in mobile applications or navigation applications used by the users. The user interface module 313 may be configured to update the rendered recommendations on receiving control instructions from the processor 303.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 311 via a bus for passing information among components of the system 200. The memory 311 may be non-transitory and may include, for example, one or more volatile and/or non-volatile memories. In other words, for example, the memory 311 may be an electronic storage device (for example, a computer readable storage medium) comprising gates configured to store data (for example, bits) that may be retrievable by a machine (for example, a computing device like the processor 303). The memory 311 may be configured to store information, data, content, applications, instructions, or the like, for enabling the apparatus to carry out various functions in accordance with an example embodiment of the present invention. For example, the memory 311 could be configured to buffer input data for processing by the processor 303. As exemplarily illustrated in FIG. 3, the memory 311 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 105 for providing navigation and parking recommendation services and roadwork zone identification services. In some embodiments, the mapping platform 105 may be configured to provide an environment for development of parking strategy recommendation solutions for navigation systems in accordance with the embodiments disclosed herein. The environment may be accessed using the user interface module 313 of the mapping platform 105 disclosed herein. The user interface module 313 may provide an interface for accessing various features and data stored in the mapping platform 105.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to generate roadwork extension data of one or more roadwork zones, according to the embodiments disclosed herein. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 303 to provide output to the user and, in some embodiments, to receive an indication of a user input. In some example embodiments, the system 200 may include a user interface 205 that communicates with the processor 303 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 303 may comprise user interface circuitry configured to control at least some functions of one or more user interface elements such as a display and, in some embodiments, a plurality of speakers, a ringer, one or more microphones and/or the like. The processor 303 and/or user interface circuitry comprising the processor 303 may be configured to control one or more functions of one or more user interface elements through computer program instructions (for example, software and/or firmware) stored on a memory accessible to the processor 303 (for example, memory device 310, and/or the like). In some example embodiments, the processor 303 may be configured to provide a method for determining roadwork extension data for identification of at least one roadwork extension as will be discussed in conjunction with FIG. 4 as below.

FIG. 4 exemplarily illustrates a method 400 for determining roadwork extension data for identification of at least one roadwork extension, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 311 of the mapping platform 105, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 311 that may direct a computer or other programmable apparatus to function in a particular manner, such that the instructions stored in the computer-readable memory 311 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for determining roadwork extension data for identification of at least one roadwork extension includes, at 401, clustering a first plurality of lane marking observations captured by a plurality of vehicles, based on a lane marking location and a lane marking heading of each of the first plurality of lane marking observations to generate at least one lane marking cluster. At 403, the method 400 may include map-matching the generated at least one lane marking cluster to one or more links based on the lane marking location and the lane marking heading of each lane marking observation in the generated at least one lane marking cluster, to obtain one or more map-matched links. At 405, the method 400 searching for one or more missing links associated with each of the map-matched links based on link attributes of the map-matched links and a distance threshold and at 407, the method includes generating the roadwork extension data based on the map matched links and the missing links as disclosed in the detailed description of FIG. 3.

In an example embodiment, a system for performing the method of FIG. 4 above may comprise a processor (e.g. the processor 303) configured to perform some or each of the operations (401-407) described above. The processor may, for example, be configured to perform the operations (401-407) by performing hardware implemented logical functions, executing stored instructions, or executing algorithms for performing each of the operations. Alternatively, the system may comprise means for performing each of the operations described above. In this regard, according to an example embodiment, examples of means for performing operations 401-407 may comprise, for example, the processor 303 and/or a device or circuit for executing instructions or executing an algorithm for processing information as described above.

On implementing the method 400 disclosed herein, the end result generated by the mapping platform 105 is a tangible determination of roadwork extension data for identifying extent of one or more roadwork zones. Roadwork zones are preceded by lane markings. The determination of the extent of the roadwork zone along with the route through the roadwork zone aids in smooth and well planned navigation of vehicles through the roadwork zones. The determination of the roadwork extension data prior to navigation of an autonomous vehicle through the roadwork zone aids the autonomous vehicles in transitioning from an autonomous mode to a manual mode smoothly. In a roadwork zone, operating the autonomous vehicle in the manual mode is preferred to avoid any undue mishaps or collisions from taking place. In the process of determination of one or more routes through a roadwork zone, the mapping platform 105 overcomes the shortcomings of the point based observations and failure in detection of some lane markings by determining connectivity between map-matched links generated from the obtained lane marking observations. The determination of the route through the roadwork zone may be based on randomly distributed locations of the lane markings, which may be few hundred meters away or a few tens of meters away from each other, captured by the vehicles.

Example embodiments disclosed herein provide an improvement in navigation technology related to roadwork zones as follows: The roadwork zone may have numerous people working with heavy machinery. The roadwork zone may lead to a blockage on the road and may result in diversions or merging of the lanes of the road. A prior determination of a extent of a roadwork zone to a vehicle may avoid any accident from taking place at the roadwork zone due to plying vehicles and also saves travel time of users plying via the roadwork zone. Planned navigation of vehicles through the roadwork zone on one of the routes through the roadwork zone may allow authorities to plan and manage movement of the heavy machinery at the roadwork zone to avoid mishaps. The mapping platform 105 uses lane marking observations generated from the vehicles plying via a roadwork zone and may map-match the lane marking observations. The mapping platform 105 may collect sensor data as disclosed in FIG. 2 from the vehicles on a day, obtain the lane marking observations from the collected sensor data, and cluster the lane marking observations based on location and heading of the lane markings on the same day. The collected sensor data may be stored in an OEM cloud and the mapping platform 105 may access the OEM cloud for clustering the lane marking observations and storing the clusters in the OEM cloud again. On clustering, the mapping platform 105 removes outliers from the lane marking observations to obtain the lane marking observations that are indicative of the roadwork zones. The mapping platform 105 map-matches the lane marking observations on the basis of the functional class of the links to avoid erroneously map-matching the lane marking observations to minor roads instead of highways. Thus embodiments of the present invention result in lesser processing thereby leading to low resource utilization for solving a problem deeply rooted in navigation technology, autonomous vehicles, and vehicular safety. The mapping platform 105 searches for missing links of the second link and the first link respectively and not in the upstream and the downstream of all the map-matched links. On narrowing the process of searching, the mapping platform 105 results in reducing the cumbersome search process to less resource intensive search process. The determined routes through the roadwork zones may be stored in the map database 107 to aid in navigation of the vehicles through the roadwork zone until the roadwork takes place. The determined routes through the roadwork zones stored in the map database 107 may constitute historic data for the authorities to plan roadwork in the future. The mapping platform 105, in an embodiment, may generate recommendations on different modes of transport preferable to avoid traffic on the determined routes in the roadwork zone.

FIGS. 5A-5B illustrate schematic diagrams showing clustering of lane marking observations to generate one or more lane marking clusters, in accordance with an example embodiment. As disclosed in the detailed description of FIG. 3, the mapping platform 105 may implement a DBSCAN algorithm to cluster the lane marking observations based on locations and heading data associated with the lane marking observations. The lane marking observations are discrete observations, each associated with a different combination of location and heading data. The mapping platform 105 clusters the lane marking observations into two first clusters as exemplarily illustrated in FIG. 5A, based on the location of the lane marking observations. The lane marking observations may be 100 meters apart from each other for a same roadwork zone. The mapping platform 105 may configure control parameters: minimum number of points to form a dense region (minPts) and a maximum searching radius (eps) to generate the first clusters and the lane marking clusters of the lane marking observations. In an embodiment, the mapping platform 105 may configure the eps to be 150 meters and minPts to be 3 to generate one or more first clusters. As exemplarily illustrated in FIG. 5A, the mapping platform 105 may generate 2 first clusters of location based clustered lane marking observations for two different locations associated with the lane marking observations. The mapping platform 105 labels the two first clusters as L1 and L2 to distinguish the locations of the lane marking observations. In the first cluster L1, the location based clustered lane marking observations have varied headings which may indicate different roadwork zones on different lanes of a same pathway in opposite directions.

The mapping platform 105 may further perform heading based clustering of the location based clustered lane marking observations in the 2 first clusters to multiple lane marking clusters. As exemplarily illustrated in FIG. 5B, the mapping platform 105 may distinguish the lane marking observations in the first clusters based on the heading data associated with the lane marking observations and the mapping platform 105 may obtain 4 lane marking clusters from the 2 first clusters. In an embodiment, the mapping platform 105 may configure the eps to be 20 degrees and minPts to be 3 to generate one or more lane marking clusters. The lane marking observations with a heading difference of 340 degrees between them may be clustered into the same lane marking cluster. The mapping platform 105 may further label the lane marking clusters as L1H1, L1H2, L2H1, and L2H2. Each of the lane marking clusters L1H1, L1H2, L2H1, and L2H2 indicates a roadwork zone. The mapping platform 105 may map-match the lane marking observations in each of the lane marking clusters L1H1, L1H2, L2H1, and L2H2 to links in the map database 107 to generate map-matched links indicative of roadwork zones.

FIG. 6 illustrates a schematic diagram showing a section of a map with links for map-matching of lane marking observations by the mapping platform 105, in accordance with an example embodiment. The section of the map illustrates two links 601 and 602 of different function classes. Consider the link 601 represents a highway of functional class 1 and roadwork is being performed on the highway. The highway may have minor parallel roads as emergency turnouts. Due to the roadwork zone on the highway, lanes of the highway may be merged and the vehicles, such as, 201 may move close to the minor parallel roads. The vehicles may generate lane marking observations and the mapping platform 105 may form clusters 603 and 604 indicating roadwork zones as shown. The lane marking observations are at a same distance, 15 meters, from the link 601 and 602. The link 602 may represent the parallel minor road with functional class 5. Ordinarily, the lane marking observations may be map-matched to the link 602 wrongly. However, the mapping platform 105 takes caution in map-matching the lane marking observations to link 601 with functional class 1 and avoids map-matching the lane marking observations to the link 602 with functional class 5.

As exemplarily illustrated in FIG. 6, since the lane marking observations are discrete, there may not be lane marking observations between clusters 603 and 604 for shorter distances, for example 84 meters. The lane marking observations may be clustered based on location of the lane marking observations using eps of 150 meters and thus, lane marking observations lying within 150 meters may not be clustered. The mapping platform 105 may search for missing map-matched links in the downstream and upstream of the map-matched links corresponding to the clusters 603 and 604 to obtain a route through the roadwork zone including the roadwork links. In some embodiments, the vehicles may detect light in tunnels as yellow lane markings. The mapping platform 105 may delete the map-matched links corresponding to tunnels using the map database 107.

FIG. 7 illustrates the user interface 205 showing a section of a map 701 with identified roadwork zones for a vehicle 201 to navigate, in accordance with an example embodiment. The mapping platform 105 generates roadwork extension data corresponding to the roadwork zones, such as, 702, 703, 704, 705, etc., including the start position of each of the roadwork zones 702, 703, 704, 705, etc., and the end position of each of the roadwork zones 702, 703, 704, 705, etc. The mapping platform 105 may generate location co-ordinates of the start positions and the end positions of the roadwork zones 702, 703, 704, 705, etc. The mapping platform 105, as disclosed in the detailed description of FIG. 3 renders the roadwork extension data on the user interface 205 with yellow markings at the roadwork zones 702, 703, 704, 705, etc., on the map 701 as exemplarily illustrated. The map 701 allows users of the vehicles to better plan their navigation routes through the multiple roadwork zones identified.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for determining roadwork extension data for identification of at least one roadwork extension, the method comprising:
   clustering a first plurality of lane marking observations captured by a plurality of vehicles, based on a lane marking location and a lane marking heading of each of the first plurality of lane marking observations to generate at least one lane marking cluster;
   map-matching by a processor, the generated at least one lane marking cluster to one or more links based on the lane marking location and the lane marking heading of each lane marking observation in the generated at least one lane marking cluster, to obtain one or more map-matched links;
   searching by the processor, for one or more missing links associated with each of the one or more map-matched links based on link attributes of the one or more map-matched links and a distance threshold; and
   generating by the processor, the roadwork extension data based on the one or more map matched links and the one or more missing links.

2. The method of claim 1, wherein the clustering of the first plurality of lane marking observations comprises:
   creating a first clustering label corresponding to the lane marking location of each of the first plurality of lane marking observations to generate at least one first cluster; and
   sequentially clustering a second plurality of lane marking observations in the generated at least one first cluster, based on the lane marking heading of each of the second plurality of lane marking observations to generate the at least one lane marking cluster.

3. The method of claim 2, further comprising filtering and removing outliers of the at least one first cluster and the at least one lane marking cluster.

4. The method of claim 1, wherein the generated at least one lane marking cluster is map-matched to the one or more links of one or more predefined functional classes.

5. The method of claim 1, wherein the roadwork extension data comprises a plurality of roadwork links, each comprising location data and heading data.

6. The method of claim 5, wherein the generating of the roadwork extension data comprises:
   identifying a start position of the determined at least one roadwork extension based on an upstream node of a first roadwork link of the plurality of roadwork links being labeled as a start roadwork link; and
   identifying an end position of the determined at least one roadwork extension based on the upstream node of the first roadwork link.

7. The method of claim 5, wherein the link attributes comprise a functional class of each of the plurality of roadwork links, a link start location of each of the plurality of the roadwork links and a link end location of each of the plurality of the roadwork links.

8. The method of claim 1, where the lane marking observations are associated with yellow lane markings along pathways traversed by the plurality of vehicles.

9. A system for determining roadwork extension data for identification of at least one roadwork extension, the system comprising:
   at least one memory configured to store computer program code instructions; and
   at least one processor configured to execute the computer program code instructions to:
      cluster a first plurality of lane marking observations captured by a plurality of vehicles, based on a lane marking location and a lane marking heading of each of the first plurality of lane marking observations to generate at least one lane marking cluster;
      map-match the generated at least one lane marking cluster to one or more links based on the lane marking location and the lane marking heading of each lane marking observation in the generated at least one lane marking cluster, to obtain one or more map-matched links;
      search for one or more missing links associated with each of the one or more map-matched links based on link attributes of the one or more map-matched links and a distance threshold; and
      generate the roadwork extension data based on the one or more map matched links and the one or more missing links.

10. The system of claim 9, wherein to cluster the first plurality of lane marking observations, the at least one processor is further configured to:
    create a first clustering label corresponding to the lane marking location of each of the first plurality of lane marking observations to generate at least one first cluster; and
    sequentially cluster a second plurality of lane marking observations in the generated at least one first cluster, based on the lane marking heading of each of the second plurality of lane marking observations to generate the at least one lane marking cluster.

11. The system of claim 10, wherein the at least one processor is further configured to filter and remove outliers of the at least one first cluster and the at least one lane marking cluster.

12. The system of claim 9, wherein the at least one processor is further configured to map-match the generated at least one lane marking cluster to the one or more links of one or more predefined functional classes.

13. The system of claim 9, wherein the roadwork extension data comprises a plurality of roadwork links, each comprising location data and heading data.

14. The system of claim 13, wherein to generate the roadwork extension data, the at least one processor is further configured to:
    identify a start position of the determined at least one roadwork extension based on an upstream node of a first roadwork link of the plurality of roadwork links being labeled as a start roadwork link; and
    identify an end position of the determined at least one roadwork extension based on the upstream node of the first roadwork link.

15. The system of claim 13, wherein the link attributes comprise a functional class of each of the plurality of roadwork links, a link start location of each of the plurality of the roadwork links and a link end location of each of the plurality of the roadwork links.

16. The system of claim 9, where the lane marking observations are associated with yellow lane markings along pathways traversed by the plurality of vehicles.

17. A computer program product comprising at least one non-transitory computer-readable storage medium having stored thereon computer-executable program code instructions which when executed by a computer, cause the computer to carry out operations for determining roadwork extension data for identification of at least one roadwork extension, the operations comprising:

clustering a first plurality of lane marking observations captured by a plurality of vehicles, based on a lane marking location and a lane marking heading of each of the first plurality of lane marking observations to generate at least one lane marking cluster;

map-matching the generated at least one lane marking cluster to one or more links based on the lane marking location and the lane marking heading of each lane marking observation in the generated at least one lane marking cluster, to obtain one or more map-matched links;

searching for one or more missing links associated with each of the one or more map-matched links based on link attributes of the one or more map-matched links and a distance threshold; and generating the roadwork extension data based on the one or more map matched links and the one or more missing links.

18. The computer program product of claim 17, wherein for clustering of the first plurality of lane marking observations, the operations comprise:

creating a first clustering label corresponding to the lane marking location of each of the first plurality of lane marking observations to generate at least one first cluster; and sequentially clustering a second plurality of lane marking observations in the generated at least one first cluster, based on the lane marking heading of each of the second plurality of lane marking observations to generate the at least one lane marking cluster.

19. The computer program product of claim 17, wherein the roadwork extension data comprises a plurality of roadwork links, each comprising location data and heading data.

20. The computer program product of claim 19, wherein the generating of the roadwork extension data comprises:

identifying a start position of the determined at least one roadwork extension based on an upstream node of a first roadwork link of the plurality of roadwork links being labeled as a start roadwork link; and identifying an end position of the determined at least one roadwork extension based on the upstream node of the first roadwork link.

* * * * *